(12) United States Patent
Wakeland et al.

(10) Patent No.: US 11,839,815 B2
(45) Date of Patent: Dec. 12, 2023

(54) ADAPTIVE AUDIO MIXING

(71) Applicants: Advanced Micro Devices, Inc., Santa Clara, CA (US); ATI Technologies ULC, Markham (CA)

(72) Inventors: Carl Kittredge Wakeland, Santa Clara, CA (US); Mehdi Saeedi, Markham (CA); Thomas Daniel Perry, Bellevue, WA (US); Gabor Sines, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 70 days.

(21) Appl. No.: 17/132,827

(22) Filed: Dec. 23, 2020

(65) Prior Publication Data
US 2022/0193549 A1 Jun. 23, 2022

(51) Int. Cl.
*A63F 13/67* (2014.01)
*A63F 13/79* (2014.01)
(Continued)

(52) U.S. Cl.
CPC ............ *A63F 13/54* (2014.09); *A63F 13/428* (2014.09); *G06F 3/011* (2013.01); *G06F 3/017* (2013.01);
(Continued)

(58) Field of Classification Search
CPC ........ A63F 13/428; A63F 13/54; A63F 13/60; A63F 13/67; A63F 2300/6009; A63F 2300/6081; G10H 1/0025; G10H 2250/311
See application file for complete search history.

(56) References Cited

U.S. PATENT DOCUMENTS

| 10,121,477 B2 | 11/2018 | Peng |
| 11,164,109 B2 | 11/2021 | Browne et al. |

(Continued)

OTHER PUBLICATIONS

International Search Report and Written Opinion in International Application No. PCT/US2021/063751, dated Apr. 8, 2022, 12 pages.

(Continued)

*Primary Examiner* — Lawrence S Galka
(74) *Attorney, Agent, or Firm* — KOWERT HOOD MUNYON RANKIN AND GOETZEL PC; Rory D. Rankin (57) ABSTRACT

Systems, apparatuses, and methods for performing adaptive audio mixing are disclosed. A trained neural network dynamically selects and mixes pre-recorded, human-composed music stems that are composed as mutually compatible sets. Stem and track selection, volume mixing, filtering, dynamic compression, acoustical/reverberant characteristics, segues, tempo, beat-matching and crossfading parameters generated by the neural network are inferred from the game scene characteristics and other dynamically changing factors. The trained neural network selects an artist's pre-recorded stems and mixes the stems in real-time in unique ways to dynamically adjust and modify background music based on factors such as game scenario, the unique storyline of the player, scene elements, the player's profile, interest, and performance, adjustments made to game controls (e.g., music volume), number of viewers, received comments, player's popularity, player's native language, player's presence, and/or other factors. The trained neural network creates unique music that dynamically varies according to real-time circumstances.

20 Claims, 10 Drawing Sheets

(51) Int. Cl.
  *A63F 13/54* (2014.01)
  *G06N 3/08* (2023.01)
  *G06F 16/635* (2019.01)
  *A63F 13/428* (2014.01)
  *G06F 3/01* (2006.01)
  *G11B 27/02* (2006.01)

(52) U.S. Cl.
  CPC ............... *G06N 3/08* (2013.01); *G11B 27/02* (2013.01); *A63F 2300/105* (2013.01); *A63F 2300/6081* (2013.01)

(56) References Cited

U.S. PATENT DOCUMENTS

| | | |
|---|---|---|
| 2007/0083365 A1 | 4/2007 | Shmunk |
| 2009/0082104 A1 | 3/2009 | Hegstrom |
| 2019/0083886 A1 | 3/2019 | Taylor et al. |
| 2020/0306641 A1* | 10/2020 | Kolen ..................... A63F 13/54 |
| 2022/0180882 A1 | 6/2022 | Wang et al. |

OTHER PUBLICATIONS

Plut et al., "Generative music in video games: State of the art, challenges, and prospects", Entertainment Computing, Mar. 2020, 19 pages, vol. 33.
Gaina et al., ""Did You Hear That" Learning to Play Video Games from Audio Cues", 2019 IEEE Conference on Games (CoG), Jun. 11, 2019, 4 pages.
Hutchings et al., "Adaptive Music Composition for Games", IEEE Transactions on Games (Preprint), Jul. 2, 2019, 10 pages.
Purwins et al., "Deep Learning for Audio Signal Processing", Journal of Selected Topics of Signal Processing, May 2019, pp. 206-219, vol. 13, No. 2.

\* cited by examiner

ADAPTIVE AUDIO MIXING

BACKGROUND

Description of the Related Art

Music in video games plays an important role in perceived quality and user engagement. Currently, commercial video games use pre-recorded audio tracks composed by artists. However, these pre-recorded audio tracks provide a predictable audio experience which can become repetitive for a user playing the same video game and traversing the same game scenes.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing adaptive audio mixing are disclosed herein. In one implementation, a trained neural network dynamically selects and mixes pre-recorded, human-composed music stems that are composed as mutually compatible sets. Stem and track selection, volume mixing, filtering, dynamic compression, acoustical/reverberant characteristics, segues, tempo, beat-matching and crossfading parameters generated by the neural network are inferred from the game scene characteristics and other dynamically changing factors. The trained neural network selects an artist's pre-recorded tracks and/or stems and mixes the stems in real-time in unique ways to dynamically adjust and modify background music based on factors such as game scenario, the unique storyline of the player, scene elements, the player's profile, interest, and performance, adjustments made to game controls (e.g., music volume), number of viewers, received comments, player's popularity, player's native language, player's presence, and/or other factors. The trained neural network creates unique music that dynamically varies according to real-time circumstances.

In one implementation, the system creates a dynamic audio mix when a user is playing a video game, with the mix not being repetitive. In one implementation, the system employs a heuristic algorithm that allows the composer to introduce a random variation of the way the pre-recorded stems are mixed in different scenarios in the game. These different scenarios are based on what the user is doing in the game, the scene elements, the player profile, interests, how well the user is performing, whether the user is adjusting the volume, the number of viewers in the game, and so on. These factors of how the user is interacting with the game are then used to vary the mixing parameters that generate the dynamic audio mix.

In one implementation, an adaptive artificial intelligence (AI) engine receives pre-recorded human composed music stems that are composed as mutually compatible sets. Also, the AI receives the indications of the user's interactions with the game. The AI engine performs stem and track selection, volume mixing/filtering, dynamic compression, and other steps to generate a dynamic audio mix. In one implementation, the AI engine is trained based on what the developer expects the user to react to in a positive/favorable way. For example, if the beat track came in a little too early, a tester can indicate that this was not a desirable outcome. But if the beat track came in at the appropriate time, the tester can indicate that this was a good outcome. This feedback is provided to the AI engine to enable the AI engine to adjust its settings and improve over time. This training method is a type of reinforcement learning.

Figure 1:
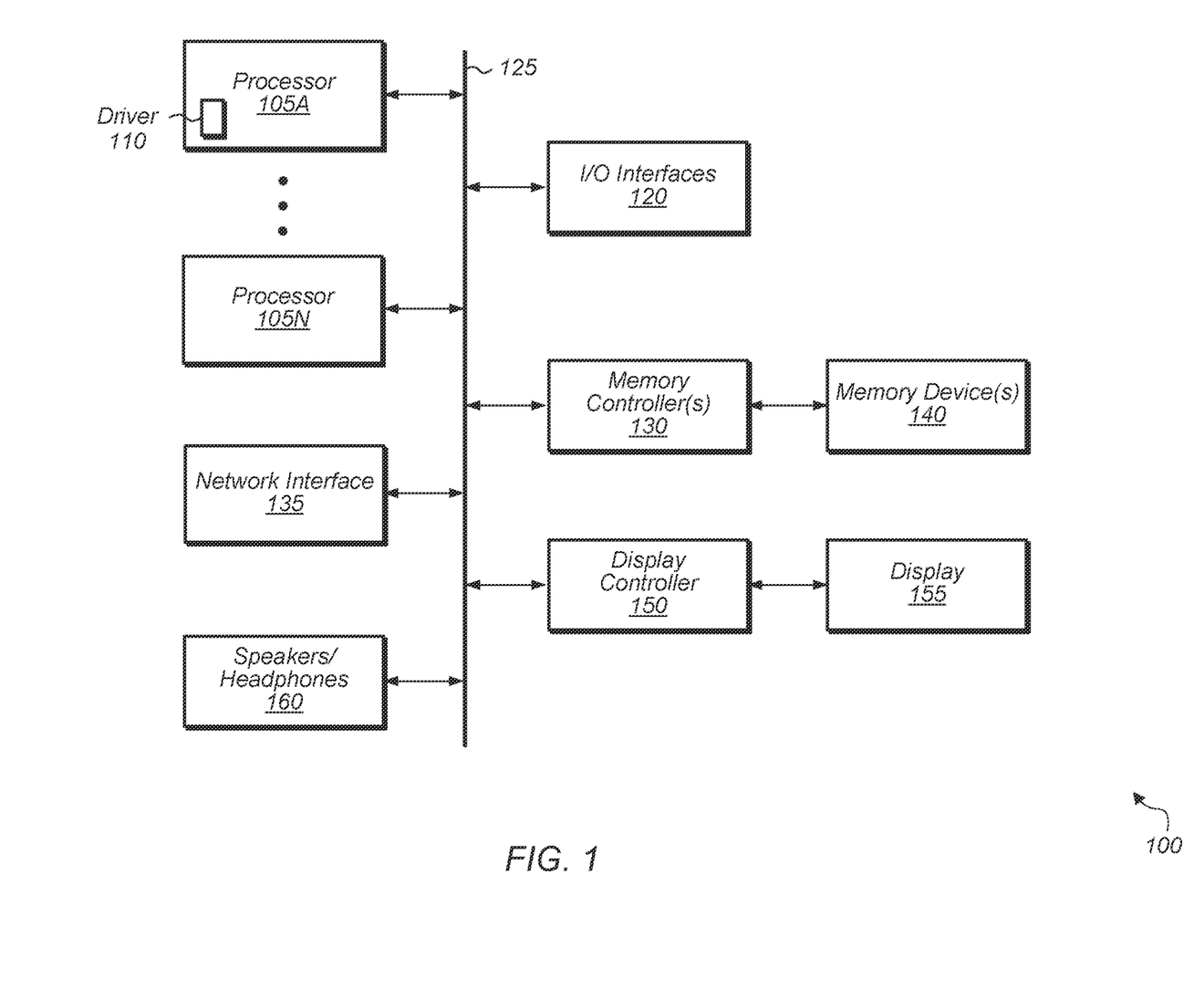
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, display 155, and speakers/headphones 160. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a dedicated neural network accelerator or a graphics processing unit (GPU) which provides pixels to display controller 150 to be driven to display 155.

A GPU is a complex integrated circuit that performs graphics-processing tasks. For example, a GPU executes graphics-processing tasks required by an end-user application, such as a video-game application. GPUs are also increasingly being used to perform other tasks which are unrelated to graphics. The GPU can be a discrete device or can be included in the same device as another processor, such as a CPU. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

An emerging technology field is machine learning, with a neural network being one type of a machine learning model. Neural networks have demonstrated excellent performance at tasks such as hand-written digit classification and face detection. Other applications for neural networks include speech recognition, language modeling, sentiment analysis, text prediction, and others. In one implementation, processor 105N is a data parallel processor programmed to execute a neural network application to generate a dynamically adaptive audio mix to be output on speakers/headphones 160 as part of a video-game application. In this implementation, the audio mix adapts to the game scenario by combining pre-recorded audio stems based on various real-time game scenario and user parameters. As used herein, the term "audio stem" is defined as an individual audio track.

In one implementation, the real-time game scenario and user parameters are input to a trained neural network which generates a mixing array of weights to apply to the pre-recorded audio stems. Examples of network topologies for the trained neural network include generative-adversarial networks (GANs), attention models, transformer networks, recurrent neural network (RNN)-Transduce networks and their derivatives, and others. The output of the trained neural network is a non-deterministic music mix which is integrated into the video game application in real-time. In one implementation, the trained neural network executes on one or more of processors 105A-N. As used herein, the term "non-deterministic" is defined as having different characteristics on different iterations through the same scenes of a video game application.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
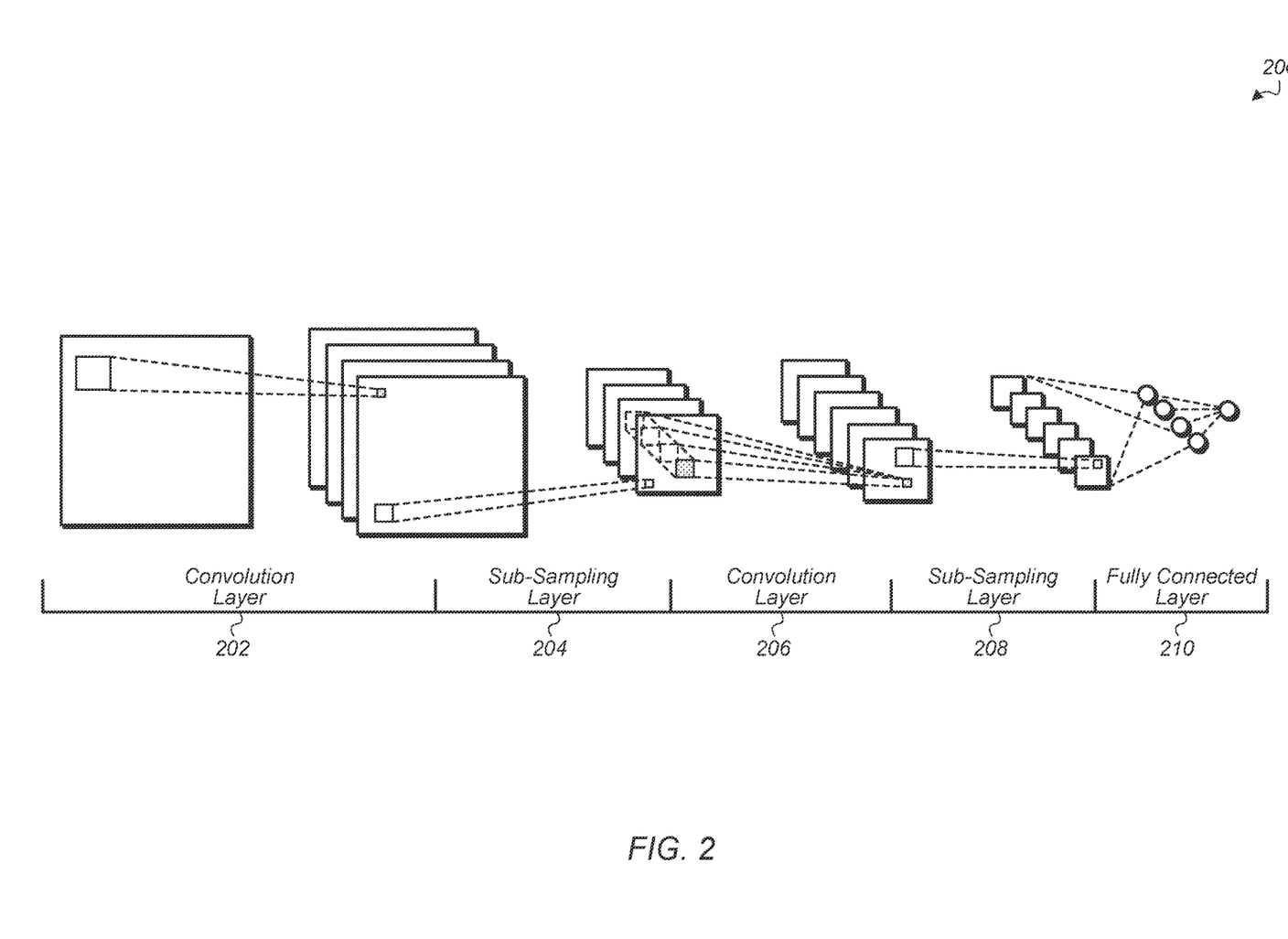
FIG. 2 is a block diagram of one implementation of a neural network.

Turning now to FIG. 2, a block diagram of one implementation of a portion of a neural network 200 is shown. The portion of neural network 200 shown in FIG. 2 includes convolution layer 202, sub-sampling layer 204, convolution layer 206, sub-sampling layer 208, and fully connected layer 210. Neural network 200 can include multiple groupings of layers similar to those shown sandwiched together to create the entire structure of the network. The other groupings of layers that are part of neural network 200 can include other numbers and arrangements of layers than what is shown in FIG. 2. It is noted that layers 202-210 are merely intended as an example of a grouping of layers that can be implemented in back-to-back fashion in one particular embodiment. The arrangement of layers 202-210 shown in FIG. 2 does not preclude other ways of stacking layers together from being used to create other types of neural networks.

When implementing neural network 200 on a computing system (e.g., system 100 of FIG. 1), neural network 200 generates an adaptive non-deterministic audio mix using a plurality of audio stems based on real-time game scenario parameters and user-specific parameters of a user playing a video game application. The adaptive non-deterministic audio mix is then integrated into the video game application and provided to the user via headphones, speakers, or other audio output device.

Figure 3:
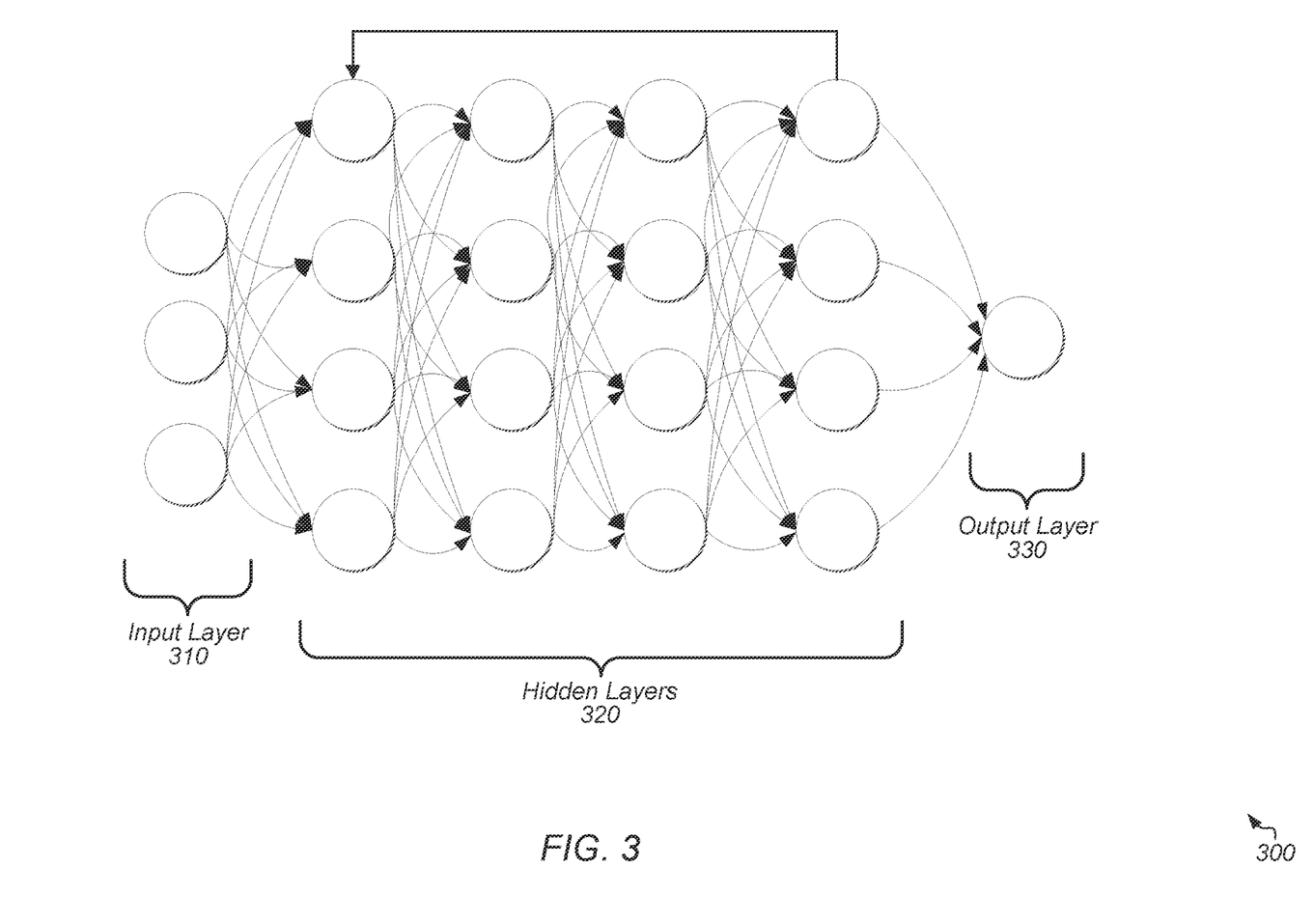
FIG. 3 is a block diagram of another implementation of a neural network.

Referring now to FIG. 3, a block diagram of another implementation of a neural network 300 is shown. Neural network 300 illustrates another example of a neural network that can be implemented on a computing system (e.g., system 100 of FIG. 1). In one implementation, neural network 300 is a recurrent neural network (RNN) and includes at least input layer 310, hidden layers 320, and output layer 330. Hidden layers 320 are representative of any number of hidden layers, with each layer having any number of neurons. Neurons that are used for RNNs include long short-term memory (LSTM), gated recurrent unit (GRU), and others. Also, any number and type of connections between the neurons of the hidden layers may exist. Additionally, the number of backward connections between hidden layers 320 can vary from network to network. In other implementations, neural network 300 includes other arrangements of layers and/or other connections between layers that are different from what is shown in FIG. 3. In some cases, neural network 300 can include any of the layers of neural network 200 (of FIG. 2). In other words, portions or the entirety of convolutional neural networks (CNNs) can be combined with portions or the entirety of RNNs to create a single neural network.

In one implementation, neural network 300 processes an input dataset to generate result data. In one implementation, the input dataset includes a plurality of real-time game scenario parameters and user-specific parameters of a user playing a video game. In this implementation, the input dataset also includes a plurality of pre-recorded audio stems. In this implementation, the result data indicates how to combine the pre-recorded audio stems to create an adaptive non-deterministic audio mix to be played to the user while playing the video game. In other implementations, the input dataset and/or the result data includes any of various other types of data.

Figure 4:
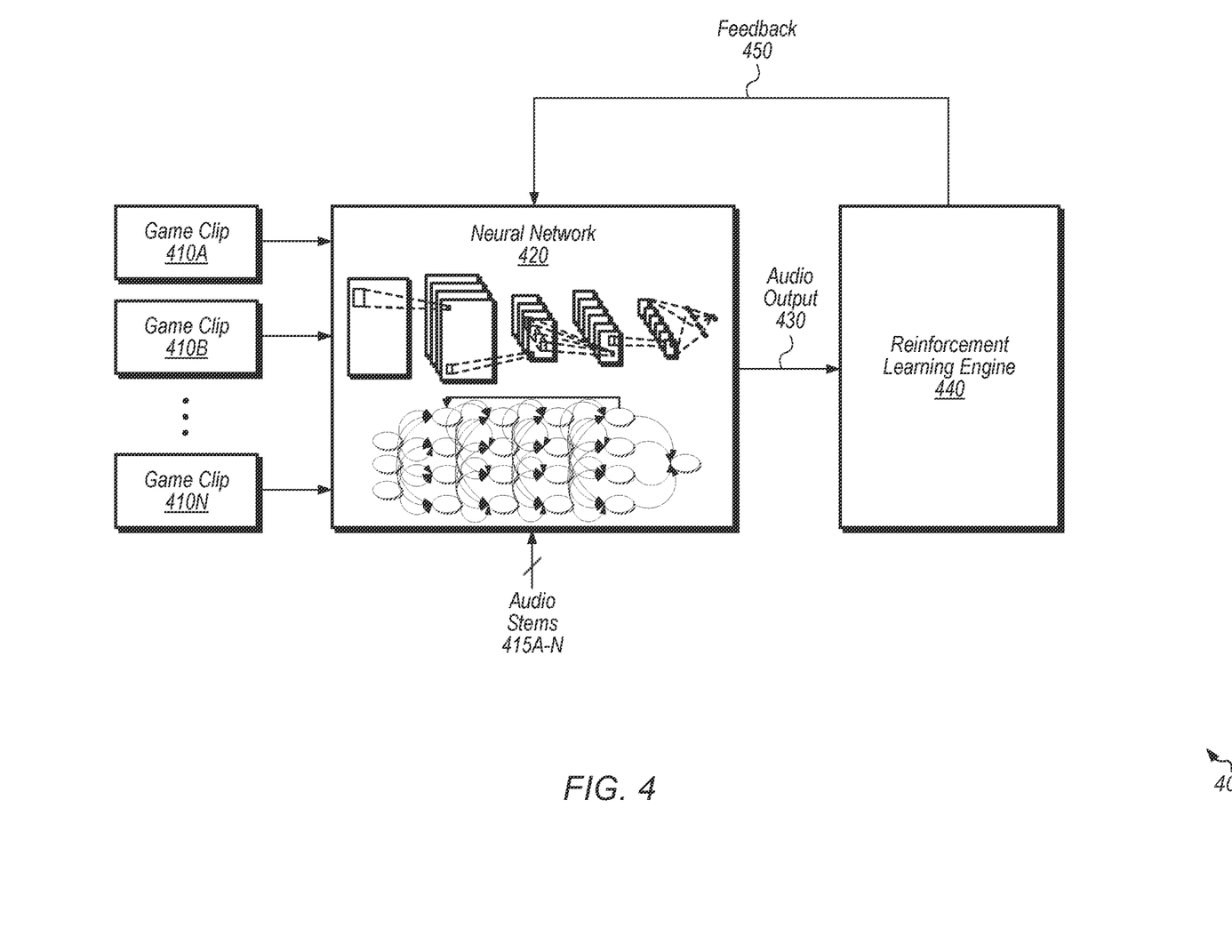
FIG. 4 is a block diagram of one implementation of an adaptive audio mixing neural network training system.

Turning now to FIG. 4, a block diagram of one implementation of an adaptive audio mixing neural network training system 400 is shown. System 400 represents one example of a pre-deployment training system for use in creating a trained neural network from a pre-deployment neural network 420. In other implementations, other ways of creating a trained neural network can be employed.

In one implementation, a game clip 410A is provided as an input to neural network 420, with game clip 410A representing a real-life example of a user playing a video game or a simulation of a user playing a video game. Neural network 420 generates audio output 430 from audio stems 415A-N based on the game scenarios encountered in game clip 410A. Audio output 430 is provided to reinforcement learning engine 440 which generates feedback 450 which is provided to neural network 420 as an indication of the quality of audio output 430. In one implementation, reinforcement learning engine 440 includes a human tester (i.e., musician, composer) evaluating the audio output 430 generated by neural network 420. In other implementations, reinforcement learning engine 440 can include any combination of human involvement and/or machine interpretive techniques such as a trained discriminator or actor-critic as used in a GAN to generate feedback 450.

In one implementation, if neural network 420 has generated a relatively high quality audio output 430, then reinforcement learning engine 440 will generate feedback 450 having a relatively high score, which will reinforce the existing parameters (i.e., weights) for the layers of neural network 420. On the other hand, if neural network 420 has generated a relatively low quality audio output 430, then feedback 450 will have a relatively low score, which will cause neural network 420 to train the layers by adjusting the parameters to counteract the "error" that was produced. Subsequent game clips 410B-N are processed in a similar manner to continue the training of neural network 420 by refining the parameters of the various layers. Training may be conducted over a series of epochs in which for each epoch the totality or a subset of the training data set is repeated, often in random order of presentation, and the process of repeated training epochs is continued until the accuracy of the network reaches a satisfactory level. As used herein, an "epoch" is defined as one pass through the complete set of training data. Also, a "subset" refers to the common practice of setting aside a portion of the training data to use for validation and testing vectors.

Figure 5:
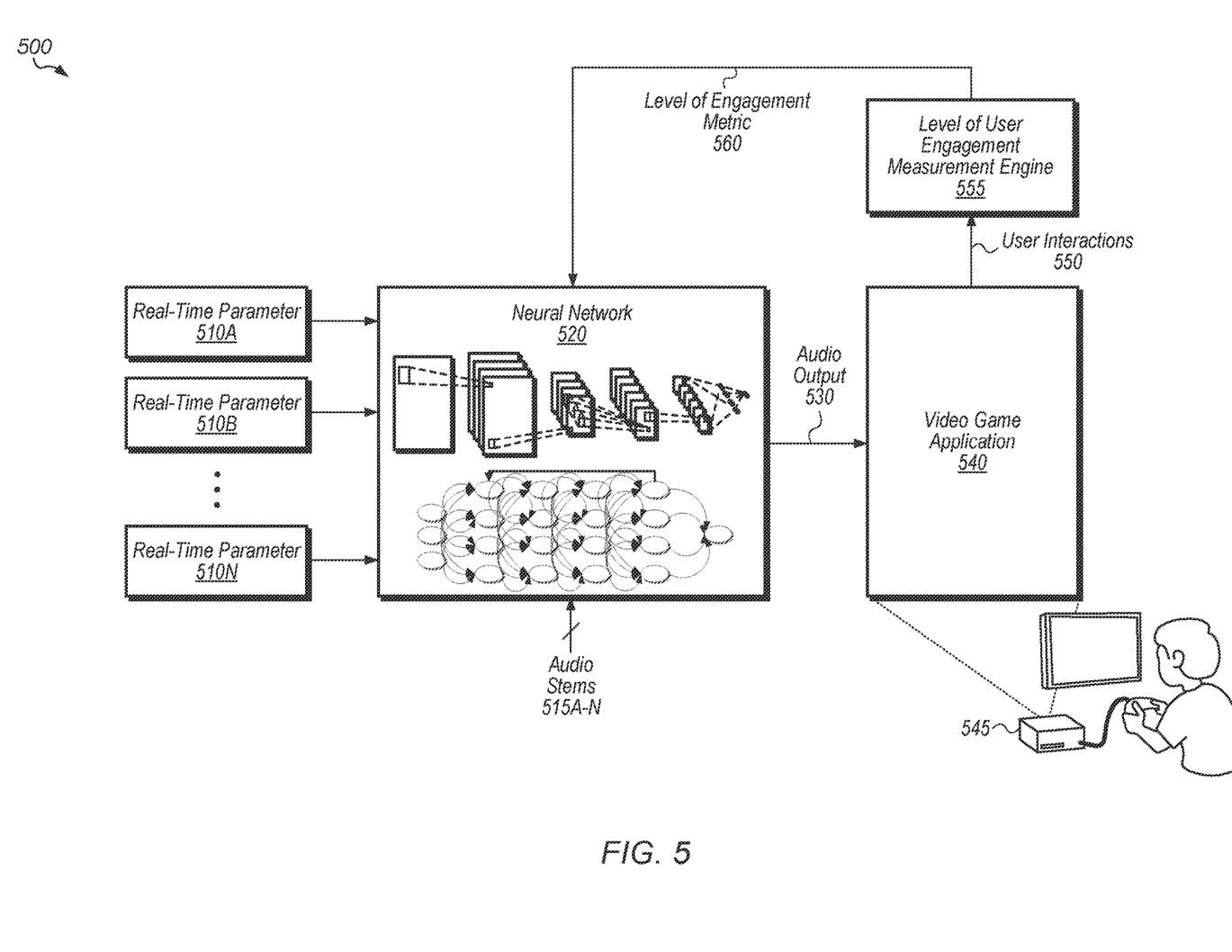
FIG. 5 is a block diagram of one implementation of an adaptive audio mixing neural network training system.

Referring now to FIG. 5, a block diagram of one implementation of an adaptive audio mixing neural network training system 500 is shown. System 500 represents a real-time use environment when a neural network 520 has been deployed as part of a video game application 540 in the field to continue to adapt the weights of the layers of neural network 520 to improve the adaptive audio mixing algorithm. These updated weights can be uploaded to the cloud to allow these updates to be applied to other neural networks. Accordingly, after neural network 520 has been deployed, incremental training can continue so as to refine the characteristics of neural network 520. This allows neural network 520 to improve the generation of audio output 530 so as to enhance the overall user experience.

Real-time parameters 510A-N are those parameters collected in real-time during use of the video game application 540 by a user. Neural network 520 uses real-time parameters 510A-N as inputs to the layers of neural network 520 so as to generate audio output 530 from audio stems 515A-N. Audio output 530 is then provided to video game application 540 and presented to the user. While the user is playing the video game, the user interactions 550 will be captured, such as the user's navigating the video game application environment, the user's performance, the user changing any game settings, user movements, and so on. These user interaction data sequences are provided to level of user engagement measurement engine 555. In one implementation, video game application 540 executes on a game console 545. Game console 545 includes any of the components shown in system 100 (of FIG. 1) as well as other components not shown in system 100. In another implementation, video game application 540 executes in the cloud as part of a cloud gaming scenario. Any of the other components shown in FIG. 5 can be implemented locally on the game console 545 or other computer hardware local to the user and/or one or more of these components can be implemented in the cloud.

Engine 555 generates a measurement of the level of user engagement, which is shown as level of engagement metric 560. In one implementation, engine 555 is a trained neural network. Depending on the implementation, level of engagement metric can have a range from 0-1, 0-10, 0-63, or any other suitable range corresponding to the particular training algorithm. Level of engagement metric 560 is provided to neural network 520 as an indication of the measure of goodness of audio output 530. In various implementations, level of engagement metric 560 is generated on a periodic basis, with the updates provided to neural network 520.

Level of engagement metric 560 is used to incrementally train neural network 520 after deployment in the field. In one implementation, the higher the value of level of engagement metric 560, the higher the positive feedback that is provided to neural network 520 to indicate that neural network 520 chose the right combination of audio stems 515A-N and the right combination of processing techniques to produce audio output 530. Also, in this implementation, the lower the value of level of engagement metric 560, the more negative feedback that is provided to neural network 520 to indicate that neural network 520 did a poor job of choosing the combination of audio stems 515A-N and processing techniques to produce audio output 530. This feedback, either positive or negative, which can vary throughout the time the user is playing video game application 540, will enable neural network 520 to continue its training and perform better in future iterations when dynamically generating audio output 530. In one implementation, the learning rate of neural network 520 is held within a programmable range to avoid making overly aggressive changes to the trained parameters in the field. The learning rate is a variable scale factor which adjusts the amount of change that is applied to the trained parameters during these incremental training passes.

Neural network 520 can have different settings for different scenes, for different video games, for different players/users, and these settings can be pre-loaded based on where in the game the user is navigating, which video game the user is playing, and so on. For example, during a more dangerous part of the game, neural network 520 has a first set of parameters for its layers. During a less dangerous phase of the game, for example, when the user is riding in a car, waiting at a restaurant or store, reading a book, or so on, then neural network 520 has a second set of parameters for its layers. Neural network 520 can have any number of different sets of parameters for an individual game and these can be loaded and programmed into the layers in real-time as different phases of the game are encountered. Each set of parameters is trained based on level of engagement metric 560 received during the corresponding part of the game independently from how the other sets of parameters are trained in their respective parts of the game. Different scenes may also use different sets of stems from which neural network 520 makes selections to generate the sound mix for the specific scene, based on these different parameters.

Figure 6:
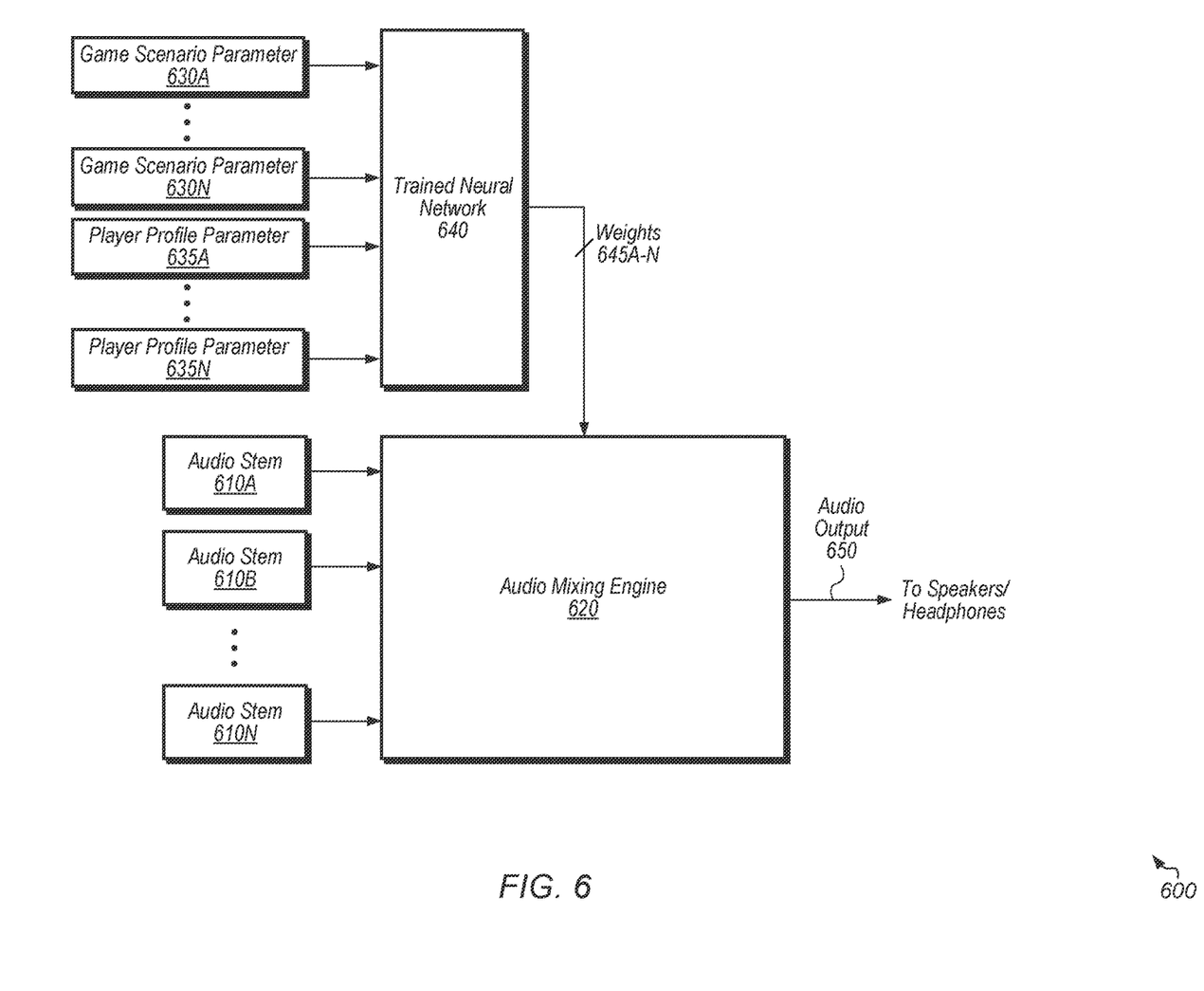
FIG. 6 is a block diagram of one implementation of an adaptive audio mixing system.

Turning now to FIG. 6, a block diagram of one implementation of an adaptive audio mixing system 600 is shown. In one implementation, system 600 includes at least audio mixing engine 620 and trained neural network 640. FMOD® and WWise™ are commercial examples of audio mixing engines used in games. Audio mixing engine 620 and trained neural network 640 can be implemented using any combination of hardware and/or program instructions. For example, in one implementation, audio mixing engine 620 and trained neural network 640 are implemented on one or more GPUs. In another implementation, audio mixing engine 620 and trained neural network 640 are implemented on another type of parallel processor (e.g., FPGA, ASIC). In other implementations, audio mixing engine 620 and trained neural network 640 can be implemented using other types of hardware devices (e.g., CPU) and/or program instructions.

In one implementation, trained neural network 640 receives a plurality of game scenario parameters 630A-N and a plurality of player profile parameters 635A-N. The game scenario parameters 630A-N are specific to the characteristics of the video game being played and where the user is within the game. The game scenario parameters 630A-N can include game scene characteristics such as the unique storyline the player has experienced, scene elements, and so on. The player profile parameters 635A-N can include characteristics such as the player's interest, player's performance, player's adjustment of game controls, a number of the player's viewers, the types of comments the player is receiving, the player's popularity, the player's native language, the player's presence, and so forth. Some of the player profile parameters 635A-N will be static and some of the player profile parameters 635A-N will change throughout the game.

The plurality of game scenario parameters 630A-N and the plurality of player profile parameters 635A-N are provided as inputs to trained neural network 640. These inputs are processed by the various layers of trained neural network 640 to generate a set of audio mixing weights 645A-N. Audio mixing weights 645A-N are representative of any number of outputs generated by trained neural network 640. In one implementation, audio mixing weights 645A-N are an array of values that are applied to audio stems 610A-N. In this implementation, there is an output 645A-N which corresponds to each audio stem 610A-N and which defines how these audio stems 610A-N are mixed together by audio mixing engine 620 to produce audio output 650. In other implementations, weights 645A-N are applied by audio mixing engine 620 in other manners to generate audio output 650 from audio stems 610A-N. In some implementations, weights 645A-N include timing parameters which specify the timing of when audio stems 610A-N are mixed together to produce audio output 650.

In one implementation, audio stems 610A-N are pre-recorded audio tracks generated by a composer. Audio mixing engine 620 determines how to combine audio stems 610A-N based on weights 645A-N generated by trained neural network 640. For example, in one implementation, each weight 645A-N is applied to a corresponding audio stem 610A-N which determines whether the audio stem is included in the mix. For example, in this implementation, there is a one-to-one correspondence between weights 645A-N and audio stems 610A-N. It is noted that audio mixing weights 645A-N may be time-varying. In one implementation, each weight 645A-N is a binary value of 0 or 1, while in other implementations, each weight 645A-N can take on any value in a given range. In other implementations, audio mixing engine 620 applies weights 645A-N to audio stems 610A-N in other manners to produce audio output 650. Audio output 650 is then provided to the user via speakers, headphones, or another audio output device.

Figure 7:
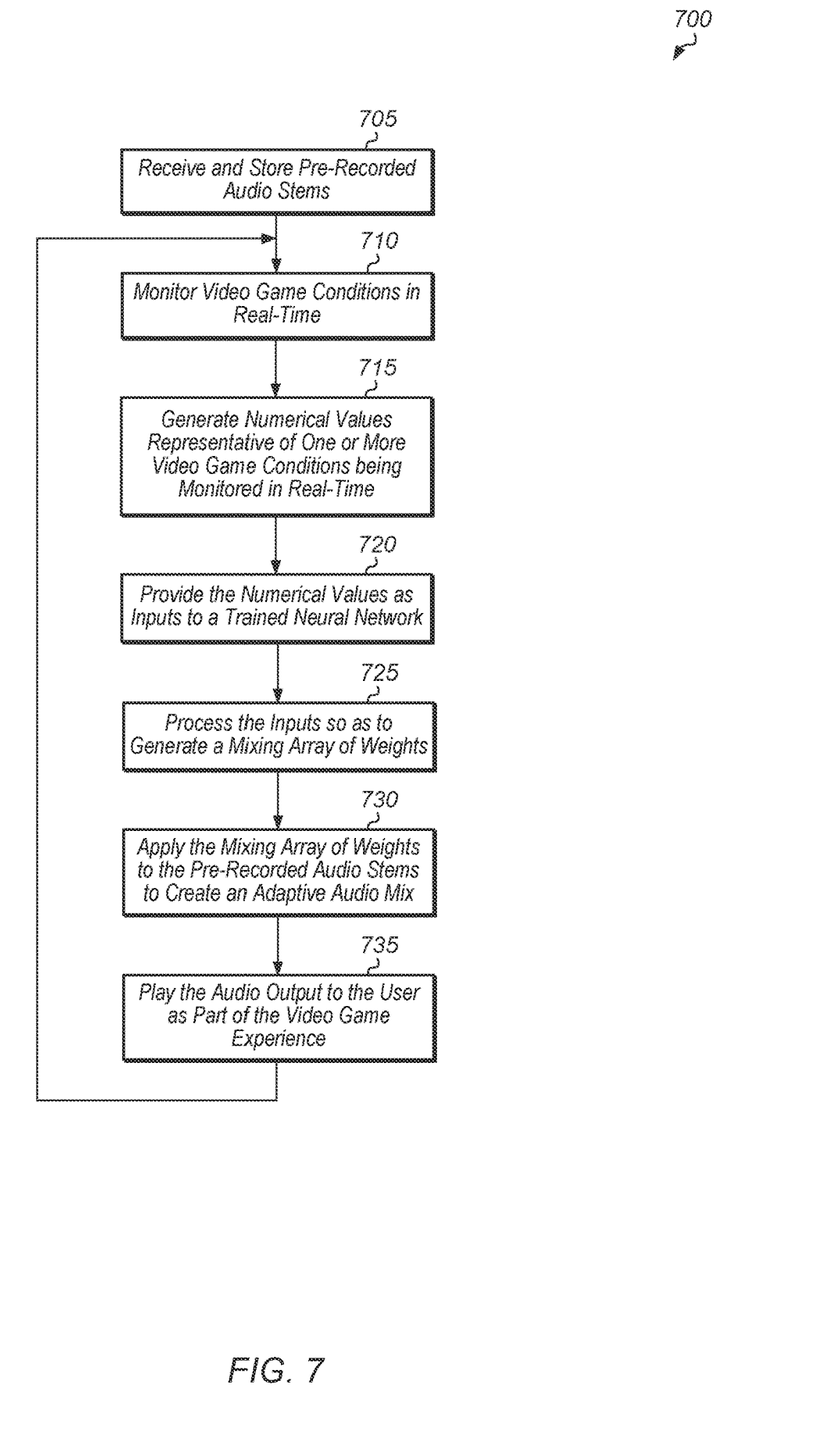
FIG. 7 is a generalized flow diagram illustrating one implementation of a method for performing adaptive audio mixing.
Figure 8:
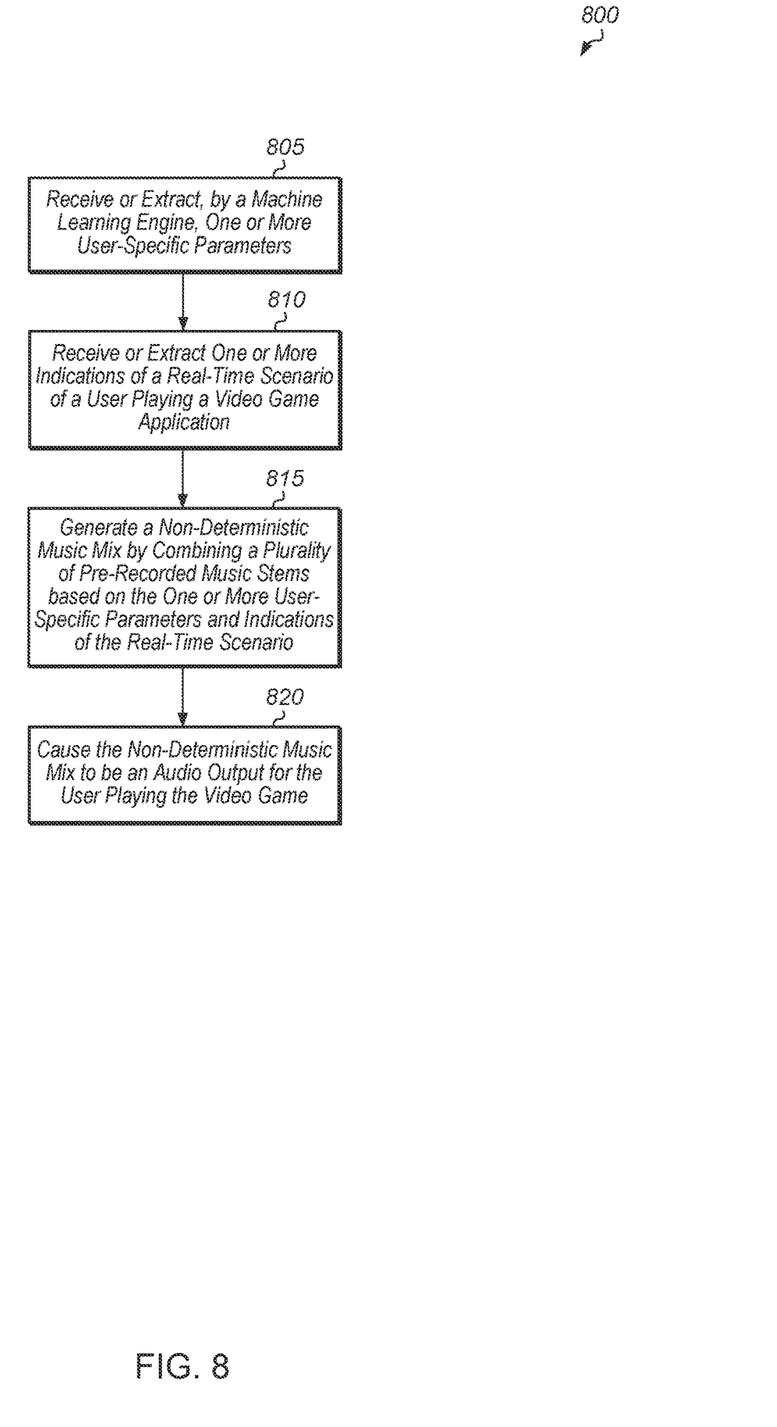
FIG. 8 is a generalized flow diagram illustrating one implementation of a method for dynamically generating an audio output by a machine learning engine.
Figure 9:
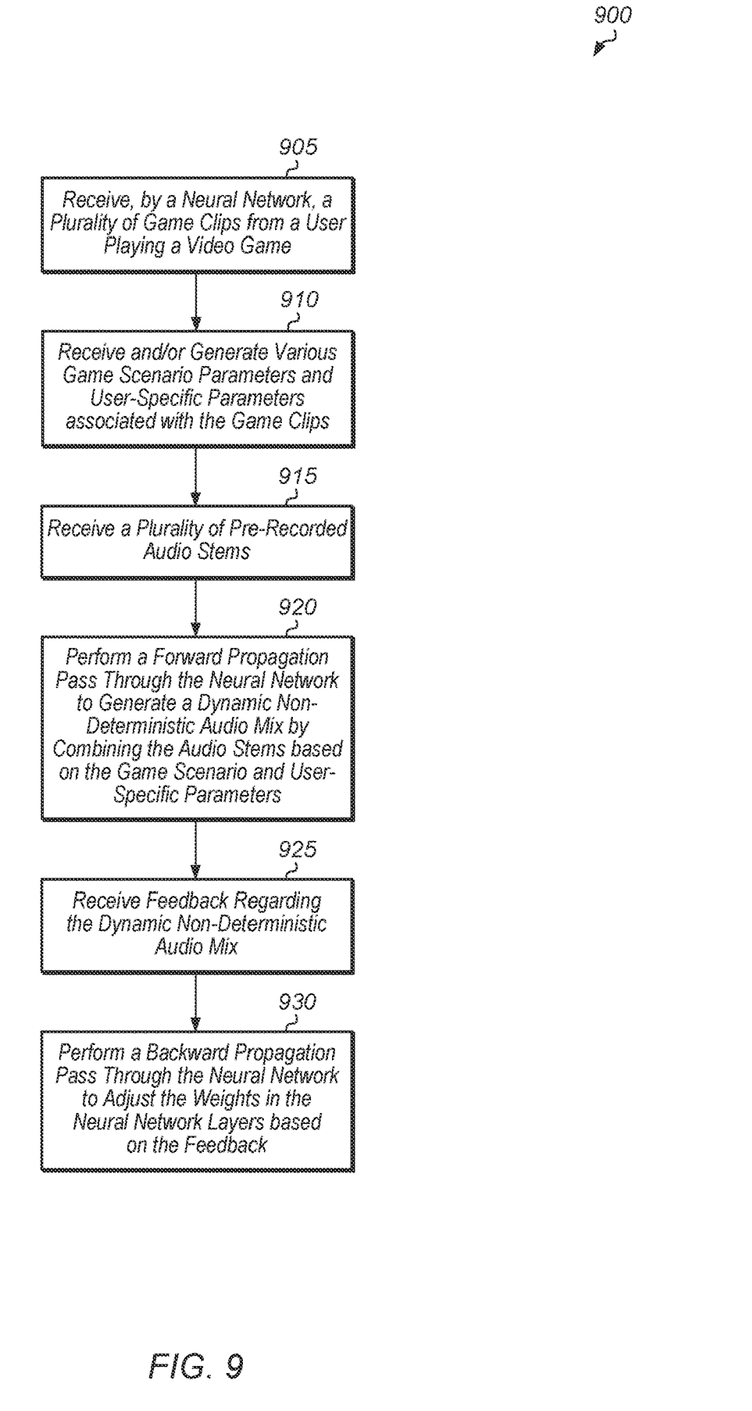
FIG. 9 is a generalized flow diagram illustrating one implementation of a method for training a neural network to generate a dynamic non-deterministic audio mix for a video game application.
Figure 10:
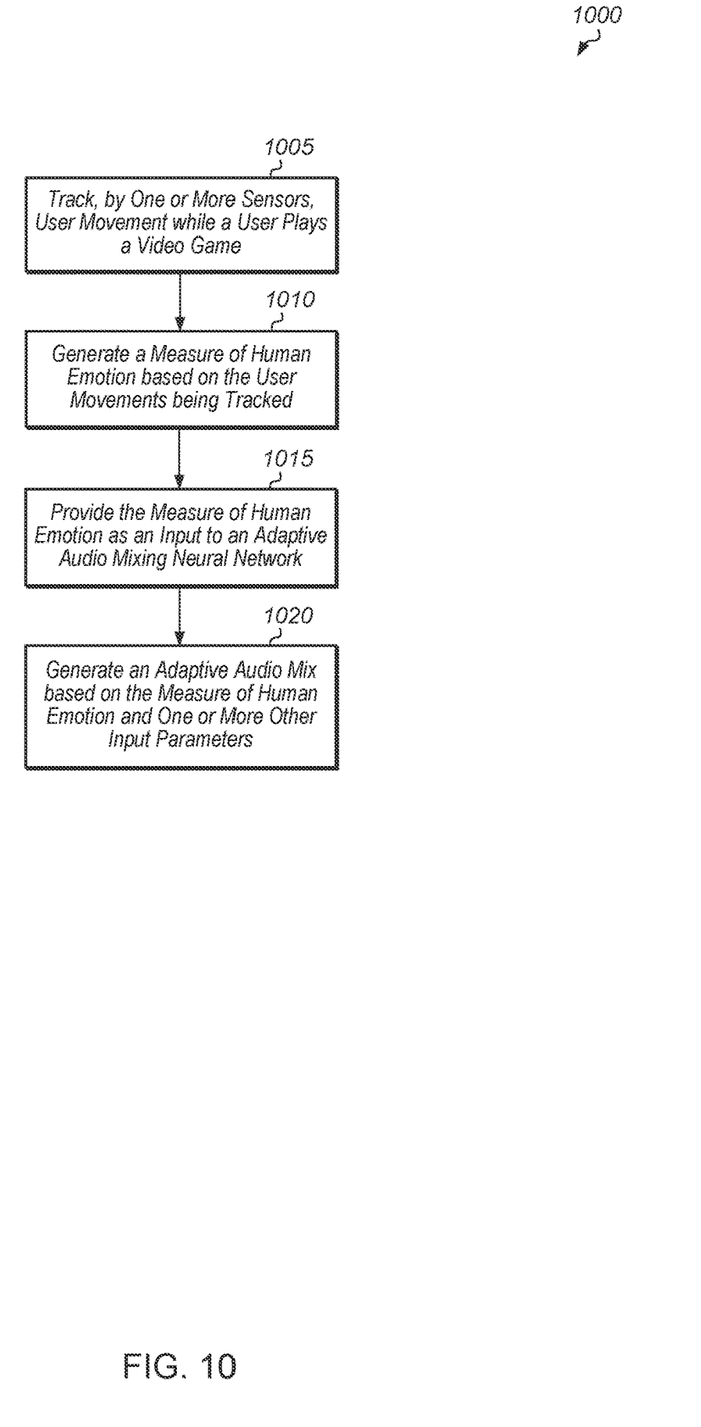
FIG. 10 is a generalized flow diagram illustrating one implementation of a method for influencing an adaptive audio mixing neural network based on a measure of human emotion captured via user movement.

Referring now to FIG. 7, one implementation of a method 700 for performing adaptive audio mixing is shown. For purposes of discussion, the steps in this implementation and those of FIG. 8-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A system receives and stores pre-recorded audio stems (block 705). The system monitors video game conditions in real-time (block 710). The system generates numerical values representative of one or more video game conditions being monitored in real-time (block 715). For example, the performance of a user can be monitored and converted into a score in a given range. The given range can be 0-63 in one implementation, and the trained neural network converts the user's performance into the given range, with 0 being the lowest performance and 63 being the highest performance. Other video game conditions can also be converted into a numerical value in a similar fashion.

The numerical values are provided as inputs to a trained neural network (block 720). Next, the trained neural network processes the inputs so as to generate a mixing array of weights (block 725). Then, the trained neural network applies the mixing array of weights to the pre-recorded audio stems to create an adaptive audio mix (block 730). Next, the audio output is played for the user as part of the video game experience (block 735). After block 735, method 700 returns to block 710 with the system continuing to monitor real-time video game conditions. The granularity at which updates to the adaptive audio mix are generated can vary from implementation to implementation. In one implementation, if a change to the video game conditions greater than a threshold is detected, then the adaptive audio mix is updated by taking another pass through method 700.

In one example, a trained neural network may increase the volume level or crispness of stems that include percussive effects to reinforce a player's increased level of excitement as determined by the video game conditions represented in the numerical values. Or in a different scene, the mix of string or woodwind sounds may be increased to intensify an emotional response in the player as inferred from the numerical values. In another example, the trained neural network may reduce the volume of the sound if the numerical values are inferred to indicate that the player is distracted.

Turning now to FIG. 8, one implementation of a method 800 for dynamically generating an audio output by a machine learning engine is shown. A machine learning engine receives or extracts one or more user-specific parameters (block 805). In one implementation, the machine learning engine is a trained neural network. In other embodiments, the machine learning engine is implemented based on other types of artificial intelligence or reinforcement learning models. The user-specific parameters include, but are not limited to, the following: the player's interest, the player's performance, the player's adjustment of game controls, a number of the player's viewers, the types of comments the player is receiving, the player's popularity, the player's native language, and the player's presence. Also, the machine learning model receives or extracts one or more indications of a real-time scenario of a user playing a video game application (block 810). The one or more indications of the real-time scenario of the user playing the video game application include, but are not limited to, the following: the unique storyline the player has experienced, scene elements, scene characters, and the scene's overall level within the game structure.

Next, the machine learning engine generates a non-deterministic music mix by combining a plurality of pre-recorded music stems based on the one or more user-specific parameters and the one or more indications of the real-time scenario (block 815). Then, the host computing system or apparatus causes the non-deterministic music mix to be an audio output for the user playing the video game (block 820). After block 820, method 800 ends. It is noted that method 800 can be repeated on periodic or programmable intervals to update the non-deterministic music mix that is generated for the user. Also, the mix levels may be time-varying. For example, the mix levels can have a gradual increase or decrease in levels of volume and/or equalization on individual stems or on the global mix.

Referring now to FIG. 9, one implementation of a method 900 for training a neural network to generate a dynamic non-deterministic audio mix for a video game application is shown. A neural network receives a plurality of game clips from a user playing a video game (block 905). The neural network includes any number and type of layers, with the number and type of layers varying according to the implementation. The game clips can be recorded game clips from historical video game play or the game clips can be received in real-time from a user playing a video game. In some cases, a combination of historical and real-time game clips can be received by the neural network. Also, the neural network receives and/or generates various game scenario parameters and user-specific parameters associated with the game clips (block 910). The neural network also receives a plurality of pre-recorded audio stems (block 915). In one implementation, the pre-recorded audio stems are created by a music composer to be used with a particular video game application.

Next, a forward propagation pass is performed through the neural network to generate a dynamic non-deterministic audio mix by combining the audio stems based on the game scenario parameters and user-specific parameters (block 920). Then, the neural network receives feedback regarding the dynamic non-deterministic audio mix (block 925). In one implementation, the feedback is generated by a tester, game composer, or other person who listens to and evaluates the dynamic non-deterministic audio mix. The feedback can include a score generated by the tester, and the tester can adjust the score at different moments throughout the entirety of the audio mix. In another implementation, the feedback is generated in real-time based on actions taken by a user playing the video game application. In this implementation, the feedback is inferred based on the user actions, such as adjusting the volume, an improved or reduced performance, and so on. In a further implementation, a discrimination network is pre-trained by supervisory methods to recognize the parameters used in appropriate musical mixes for the scene to create an initial starting point for the reinforcement learning passes.

Next, a backward propagation pass is performed through the neural network to adjust the weights in the neural network layers based on the feedback (block 930). After block 930, method 900 ends. It is noted that method 900 can be repeated any number of times with different training sets to iteratively refine the weights of the neural network layers.

Turning now to FIG. 10, one implementation of a method 1000 for influencing an adaptive audio mixing neural network based on a measure of human emotion captured via user movement is shown. One or more sensors track user movement while a user plays a video game (block 1005). Next, a level of user engagement measurement engine (e.g., level of user engagement measurement engine 555 of FIG. 5) generates a measure of human emotion based on the user movements being tracked (block 1010). For example, if the user's arms and/or legs are being tracked, the relative amount of movement of the arms and/or legs, as compared to earlier amounts of movement by the user or amounts of movement for other users, provides an indication of the emotion of the user. In one implementation, the measure of the user's emotion is intended to represent how lethargic the user is on one end of the scale or how upbeat the user at the other end of the scale.

Then, the measure of human emotion is provided as an input to an adaptive audio mixing neural network (block 1015). The adaptive audio mixing neural network generates an adaptive audio mix based on the measure of human emotion and one or more other input parameters (block 1020). For example, if the measure of human emotion is greater than a threshold, then the adaptive audio mixing neural network increases a tempo of the adaptive audio mix. Other changes to the adaptive audio mix based on the measure of human emotion and the other input parameters can also be implemented. The other input parameters can vary according to the implementation, and can be any of the previously listed scene and/or user-specific parameters. After block 1020, method 1000 ends. It is noted that method 1000 can be repeated during video game play to update the adaptive audio mix that is generated by the neural network.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a machine learning engine comprising circuitry configured to:
receive one or more user-specific parameters of a user laying a video game application;
receive one or more indications of a real-time scenario of the user playing the video game application;
generate a non-deterministic music mix by combining a plurality of pre-recorded music stems based on the one or more user-specific parameters and the one or more indications of the real-time scenario; and
cause the non-deterministic music mix to be an audio output for the user playing the video game application in real-time;
wherein the machine learning engine is updated based on one or more feedback indicators, wherein the feedback indicators comprise a user adjustment to a game setting, an activity level of the user, and a performance of the user.

2. The apparatus as recited in claim 1, wherein the one or more user-specific parameters comprise one or more of player profile, player interest, player performance, an adjustment of game controls, a number of viewers, a popularity of the user, and a native language of the user.

3. The apparatus as recited in claim 1, wherein the one or more indications of the real-time scenario comprise a story line of a player, one or more scene elements, and one or more game scene characteristics.

4. The apparatus as recited in claim 1, wherein the machine learning engine is a trained neural network.

5. The apparatus as recited in claim 1, wherein the non-deterministic music mix is generated based at least in part on an emotion of the user.

6. The apparatus as recited in claim 4, wherein an updated version of the trained neural network is configured to generate an updated non-deterministic music mix on a subsequent iteration of the video game application.

7. The apparatus as recited in claim 4, wherein the activity level of the user is determined by tracking user movement while the user is playing the video game application, and wherein the trained neural network is configured to increase a tempo of the non-deterministic music mix responsive to detecting that the activity level of the user is greater than a threshold.

8. A method comprising:
receiving, by circuitry of a machine learning engine, one or more user-specific parameters of a user playing a video game application;
receiving one or more indications of a real-time scenario of the user playing the video game application;
generating a non-deterministic music mix by combining a plurality of pre-recorded music stems based on the one or more user-specific parameters and the one or more indications of the real-time scenario;
causing the non-deterministic music mix to be an audio output for the user playing the video game application in real-time; and
updating the machine learning engine based on one or more feedback indicators, wherein the feedback indicators comprise a user adjustment to a game setting, an activity level of the user, and a performance of the user.

9. The method as recited in claim 8, wherein the one or more user-specific parameters, comprise one or more of a player profile, player interest, player performance, an adjustment of game controls, a number of viewers, a popularity of the user, and a native language of the user.

10. The method as recited in claim 8, wherein the one or more indications of the real-time scenario comprise a storyline of a player, one or more scene elements, and one or more game scene characteristics.

11. The method as recited in claim 8, wherein the machine learning engine is a trained neural network.

12. The method as recited in claim 8, further comprising generating the non-deterministic music mix based at least in part on an emotion of the user.

13. The method as recited in claim 11, further comprising generating, by an updated version of the trained neural network, an updated non-deterministic music mix on a subsequent iteration of the video game application.

14. The method as recited in claim 11, wherein the activity level of the user is determined by tracking user movement while the user is playing the video game application, and wherein the method further comprising increasing a tempo of the non-deterministic music mix responsive to detecting that the activity level of the user is greater than a threshold.

15. A system comprising:
a machine learning engine comprising circuitry configured to:
receive one or more user-specific parameters of a user playing a video game application;
receive one or more indications of a real-time scenario of the user playing the video game application;
generate a mixing array of weights based on the one or more user-specific parameters and the one or more indications of the real-time scenario; and
an audio mixing engine comprising circuitry configured to:
generate a non-deterministic music mix by applying the mixing array of weights to a plurality of pre-recorded music stems; and
cause the non-deterministic music mix to be an audio output for the user playing the video game application in real-time.

16. The system as recited in claim 15, wherein the one or more user-specific parameters comprise one or more of a player profile, player interest, player performance, an adjustment of game controls, a number of viewers, a popularity of the user, and a native language of the user.

17. The system as recited in claim 15, wherein the one or more indications of the real-time scenario comprise a storyline of a player, one or more scene elements, and one or more game scene characteristics.

18. The system as recited in claim 15, wherein the machine learning engine is a trained neural network, and wherein the trained neural network is updated based on one or more feedback indicators from the user.

19. The system as recited in claim 18, wherein the one or more feedback indicators comprise a user adjustment to a game setting, an activity level of the user, and a performance of the user.

20. The system as recited in claim 19, wherein an updated version of the trained neural network is configured to generate an updated non-deterministic music mix on a subsequent iteration of the video game application.

* * * * *